United States Patent Office 3,351,479
Patented Nov. 7, 1967

3,351,479
PAPER COATING COMPOSITIONS
AND PROCESSES
William P. Fairchild, San Diego, Calif., assignor to Kelco Company, San Diego, Calif., a corporation of Delaware
No Drawing. Filed May 14, 1963, Ser. No. 280,459
5 Claims. (Cl. 106—208)

The present invention relates to a new and unusual paper coating composition and to the coated paper made therefrom.

More particularly, it relates to a paper coating composition suitable for use in the manufacture of coated paper for high quality printing and to the coated paper made therefrom.

Paper coating compositions for this purpose generally consist of a mineral pigment or mixture of mineral pigments suspended in an aqueous solution or dispersion of an adhesive. Mineral pigments for this use are usually selected from a group consisting of kaolins or china clays, titanium dioxide, calcium carbonate and the like. The most common adhesives for this use are casein, soybean protein, synthetic resin emulsions and modified starch. Combinations of adhesives are sometimes used.

The requirements of a coating composition for coating paper to be used for high quality printing are quite severe. Of utmost importance, the dried coating must provide a smooth printing surface having uniform and controllable ink acceptance. Secondly, the coating film must have sufficient internal strength and must be bonded to the cellulosic fibers of the paper substrate so as to resist flaking and picking during handling and, more particularly, during the high speed printing process. In addition, the coating must provide opacity and brightness to the sheet and should accept a gloss when supercalendered.

In addition to the requirements described above pertaining to the final properties of the coated paper, the coating composition must process suitable rheological properties for proper application from the coating station to the paper surface.

Coating technologists generally recognize the fact that complete fulfillment of the requirements described above is impossible with a given coating composition. As an example, an increase in the adhesive to pigment ratio to improve strength results in lowered opacity and brightness and also reduces the degree of ink acceptance. Therefore, great care must be taken to select the proper pigment and adhesive and to use them together in proper balance to obtain the desired coated product.

The role of the adhesive in a coating composition is complex. Its functions can be listed as follows:

(1) To provide a suspending medium for the pigment.
(2) To impart desirable rheological properties to the coating composition.
(3) To control migration of the aqueous phase of the coating composition.
(4) To hold together the pigment particles and bind them to the cellulosic fibers of the paper.
(5) In conjunction with the pigment, to provide a smooth and continuous printing surface with uniform and controllable ink acceptance.

The failure of the adhesive in any one of the functions listed above detracts from the finished coated product. One method sometimes used to overcome an adhesive deficiency is to apply a thicker coating film. This adds weight to the coated paper and, since most high quality printed paper is mailed, adds considerably to postage expense. Another method often used to help alleviate an adhesive deficiency is to use an additive with the coating composition. Dispersing agents, leveling agents, lubricants and migration controlling agents have been found to be effective when added in small amounts to the coating.

Sodium alginate is often added to a coating composition in small amounts to improve the adhesive functions listed as 1, 2, 3, and 5, above. This material possesses all the requirements of an adhesive except the ability to impart strength to the coating film. This serious shortcoming has prevented the use of sodium alginate as a primary adhesive in a coating composition.

An object of the present invention is to provide processes and compositions utilizing sodium alginate in the coating of paper so that the film produced has satisfactory strength.

Other objects of the invention will appear as the description thereof proceeds.

I have found that coating compositions comprising an aqueous dispersion of mineral pigment and an aqueous solution of sodium alginate and glyoxal may be prepared which have excellent paper coating properties including the ability to hold together the pigment particles and bond them to the cellulosic fibers of the paper surface. Further, the printing qualities of paper coated with the composition of my invention are superior in all respects to those of paper coated with ordinary compositions.

In addition, I have found that common adhesives such as starch or synthetic resin emulsions may be used along with the composition of my invention to yield a coated product superior in printing qualities to that which could be obtained using starch or synthetic resin emulsion as the sole adhesive. This is sometimes desirable for economic reasons. This is all the more so since when this is done, it is possible to use less of the sodium alginate than otherwise. In general, the amount of such starch or other adhesive used should not exceed two and one-half times the amount of sodium alginate present.

Still another advantage to the use of the coating composition of my invention is that a satisfactory level of printing quality can be maintained at a lower coating weight than is possible using an ordinary coating composition. This is particularly important to users of coated printing paper who are faced with ever increasing postal rates.

Still other advantages to the use of the coating composition of my invention will be evident to those familiar with the art of paper coating.

Glyoxal is the simplest dialdehyde, and has the famulation $C_2H_2O_2$. In its pure state, it is a liquid that polymerizes rapidly to a solid even at room temperature. It is therefore commercially supplied most generally in the form of an aqueous solution, usually 30% glyoxal by weight, and having a pH of about 1.5. While I may use pure glyoxal in carrying out my invention, it is obviously much more practical and indeed best to make use of the commercially available, stable, 30% aqueous solution thereof. In the examples which follow, it will be understood that this comercial solution has been used.

I will now give some examples illustrating the practice of the invention:

EXAMPLE 1

A clay slurry was prepared containing 70 parts of a kaolin coating clay, to 30 parts of water. 260 grams of the clay slurry were added to 268 grams of an aqueous solution containing 21.8 grams of a low viscosity sodium alginate and 7.2 grams of glyoxal solids. After proper mixing, the coating was applied to lightweight rawstock on a laboratory trailing blade coater. The coatweight applied was 2.5 pounds per 3,000 square feet (one side). IGT pick tests showed this coating to be good. The Dennison wax pick was 6+. Ink wipe tests indicated uniform ink acceptance with minimum print show through. This coating compared favorably with a typical starch-clay coating at approximately twice the coatweight. The aforementioned IGT test is well known in the printing arts and is carried out on the IGT-Printability Tester. Full information relative thereto is available from the Research Institute for the Printing and Allied Industries TNO, Ter Gouwstraat 1, P.O. Box 4150, Amsterdam, Holland.

EXAMPLE II 260 grams of the clay slurry, as described in Example I above, were mixed with 263 grams of an aqueous solution containing 7.3 grams of a low viscosity sodium alginate, 3.7 grams of glyoxal solids and 16 grams of a gelatinized, low viscosity, oxidized cornstarch. After proper mixing, the coating was applied to lightweight rawstock on a laboratory trailing blade coater. The coatweight applied was 3.3 pounds per 3,300 square feet (one side). The IGT pick tests on this coating were rated as very good. The Dennison wax pick was 8. Ink wipe tests indicated uniform ink acceptance and less print showthrough than was obtained with comparable coatings containing only the starch as adhesive.

I have found that satisfactory coating compositions of the present invention can be prepared in the total solids range of 20 to 60 weight percent. Further, sodium alginate to pigment weight ratios of 10:100 to 20:100 have been found to perform very well. If the ratio drops below 10:100 a loss in coating strength is apparent. The best range is 12:100 to 15:100. The amount of glyoxal solids used in accordance with this invention is in the range of 10% to 50% based on the weight of sodium alginate. The preferred range is 30% to 40% based on weight of sodium alginate.

It has been mentioned hereinabove that other adhesives may be used along with the sodium aglinate-glyoxal mixture in accordance with my invention. Starch is probably the commonest of these, and of course it must be gelatinized, either by cooking with water, or cooking and subsequent drying to produce a pre-gelatinized material. Generally, the starches commercially produced for paper coating have been further treated, generally by oxidation as by chlorine, to produce a low viscosity starch. An instance of the use of such a material appears in Example II hereinabove. Other materials which may be used instead of or along with starch or polyvinyl alcohol, partially hydrolyzed polyvinyl acetate, and similar adhesives common to the paper coating art.

The present invention is not to be considered as limited with regard to types of mineral pigments which may be used. It is understood, however, that pigments such as calcium sulfate which supply metal ions reactive to sodium alginate are necessarily excluded. While kaolin is the commonest pigment lithopane, barium sulphate, calcium silicate, ground quartz, silica flour, and the like may in general be used, depending upon the nature of the coating desired. All viscosity grades of sodium alginate are applicable in this invention. The grades selected is necessarily dependent upon the viscosity limitations imposed by percent solids and the sodium alginate level of the coating and by the type of coater to be used for application.

While I have illustrated my invention with the aid of various specific examples, it will be understood that the invention is a broad one, and numerous variations are possible in detail, concentrations, and the like, all within the scope of the claims which follow.

What I claim is:

1. A paper coating composition comprising as essential constitutents water, a mineral pigment, sodium alginate, and glyoxal, said composition having a total solids content within the range of 20% to 60% by weight; the ratio of sodium alginate to said mineral pigment being within the range of 10 parts to 20 parts per 100 parts of said pigment; and said glyoxal being present within the range of 10% to 50% by weight of said sodium alginate.

2. The composition of claim 1 in which a gelatinized starch is present at a concentration not in excess of two and one-half times the weight of said sodium alginate present.

3. The process of coating paper which comprises the steps of applying a layer of the liquid composition of claim 1 to at least one side of said paper, and thereafter drying said coated paper.

4. The process of coating paper which comprises the steps of applying a layer of the liquid composition of claim 2 to at least one side of said paper, and thereafter drying said coated paper.

5. The composition of claim 1 wherein the weight ratio of sodium alginate to said mineral pigment is within the range of 12 parts to 15 parts per 100 parts of said pigment, and said glyoxal is present within the range of 30% to 40% by weight of said sodium alginate.

References Cited

UNITED STATES PATENTS

| | | | |
|---|---|---|---|
| 2,212,314 | 8/1940 | Bauer et al. | 106—208 |
| 2,238,839 | 4/1941 | Watkins | 8—115.6 |
| 2,549,177 | 4/1951 | Davidson | 162—175 |
| 2,632,714 | 3/1953 | Loomer | 117—156 |
| 2,771,374 | 11/1956 | Chambers et al. | 106—208 |
| 2,803,558 | 8/1957 | Fronmuller | 106—205 |
| 3,084,057 | 4/1963 | Jordan | 106—205 |

FOREIGN PATENTS

| | | |
|---|---|---|
| 634,634 | 3/1950 | Great Britain. |

ALEXANDER H. BRODMERKEL, *Primary Examiner.*

MORRIS LIEBMAN, *Examiner.*

L. B. HAYES, *Assistant Examiner.*